(12) United States Patent
Wilson (10) Patent No.: US 10,850,794 B2
(45) Date of Patent: Dec. 1, 2020

(54) SYSTEM AND METHOD FOR BALANCING A BICYCLE

(71) Applicant: Chad Wilson, Kingwood, TX (US)

(72) Inventor: Chad Wilson, Kingwood, TX (US)

(*) Notice: Subject to any disclaimer, the term of this patent is extended or adjusted under 35 U.S.C. 154(b) by 222 days.

(21) Appl. No.: 16/027,343

(22) Filed: Jul. 4, 2018

(65) Prior Publication Data

US 2020/0010141 A1    Jan. 9, 2020

(51) Int. Cl.
*B62K 21/10* (2006.01)
*B62K 3/00* (2006.01)

(52) U.S. Cl.
CPC ............... *B62K 21/10* (2013.01); *B62K 3/00* (2013.01)

(58) Field of Classification Search
CPC .......... B62K 21/10; B62K 3/00; B62K 21/14; B62K 21/20
See application file for complete search history.

(56) References Cited

U.S. PATENT DOCUMENTS

| | | | | |
|---|---|---|---|---|
| 94,056 A * | 8/1869 | Allen | ...................... | B62K 5/08 280/267 |
| 5,924,713 A * | 7/1999 | Li | ............................ | B62K 9/02 280/270 |
| 5,954,349 A * | 9/1999 | Rutzel | ..................... | B62K 21/00 280/100 |
| 6,120,048 A * | 9/2000 | Li | ............................. | B62H 7/00 280/270 |
| 6,612,598 B2 * | 9/2003 | Wu | .......................... | B62H 7/00 280/270 |
| 6,666,470 B2 * | 12/2003 | Li | ............................. | B62K 9/02 280/272 |
| 6,811,173 B1 * | 11/2004 | Shih | ........................ | B62H 7/00 280/270 |
| 8,313,117 B2 * | 11/2012 | Khare | ...................... | B62H 7/00 280/270 |
| 9,371,109 B2 * | 6/2016 | Baron | ...................... | B62D 1/12 |
| 9,376,157 B2 * | 6/2016 | Ben Meir | ................ | B62K 9/02 |
| 2004/0041364 A1 * | 3/2004 | Yen | ......................... | B62K 21/00 280/263 |

* cited by examiner

*Primary Examiner* — Ruth Ilan
*Assistant Examiner* — Marlon A Arce
(74) *Attorney, Agent, or Firm* — Spradley PLLC; Michael Spradley (57) ABSTRACT

This disclosure relates to a system for balancing a bicycle. The system can comprise a frame, a tension system, and a steering system. The frame can be capable of mounting to a bicycle. The tension system can be capable of connecting with handlebars of the bicycle. The steering system can be mounted to the frame, further the steering system can be in communication with the tension system such that manually maneuvering the steering system can adjust tension within the tension system to steer the bicycle.

20 Claims, 10 Drawing Sheets

SYSTEM AND METHOD FOR BALANCING A BICYCLE

BACKGROUND

This disclosure relates to a system and method for balancing a bicycle by using one-hand while walking, jogging, and/or running. For centuries, people around the world use bicycle for transport, recreation, exercise, and sports. Since bikers can usually be at a curled position for long period of time when cycling, bikers often feel strain in their backs. As such, bikers would want to occasionally walk alongside their bicycle to rest and stretch their back while still moving towards their destination. However, in doing so bikers would usually need to hold both bicycle handles to steer their bicycle. Thus, the biker can again be at an uncomfortable curved position while walking and maneuvering the bicycle. Further, running with a bike is incredibly difficult, as it requires the cyclist to be bent sideways to hold both handlebars. As such it would be useful to have an improved system and method for balancing a bicycle while walking.

SUMMARY

This disclosure relates to a system for balancing a bicycle. The system can comprise a frame, a tension system, and a steering system. The frame can be capable of mounting to a bicycle. The tension system can be capable of connecting with handlebars of the bicycle. The steering system can be mounted to the frame, further the steering system can be in communication with the tension system such that manually maneuvering the steering system can adjust tension within the tension system to steer the bicycle.

This disclosure also relates to a method for steering a bicycle comprising the steps of mounting a balancing system to a bicycle and steering the bicycle with the balancing system moving with the bicycle. The balancing system can comprise a frame, a tension system, and a steering system. The frame can be capable of mounting to a bicycle. The tension system can be capable of connecting with handlebars of the bicycle. The steering system can be mounted to the frame, further the steering system can be in communication with the tension system such that manually maneuvering the steering system can adjust tension within the tension system to steer the bicycle.

DETAILED DESCRIPTION

Described herein is a system and method for balancing a bicycle while walking. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
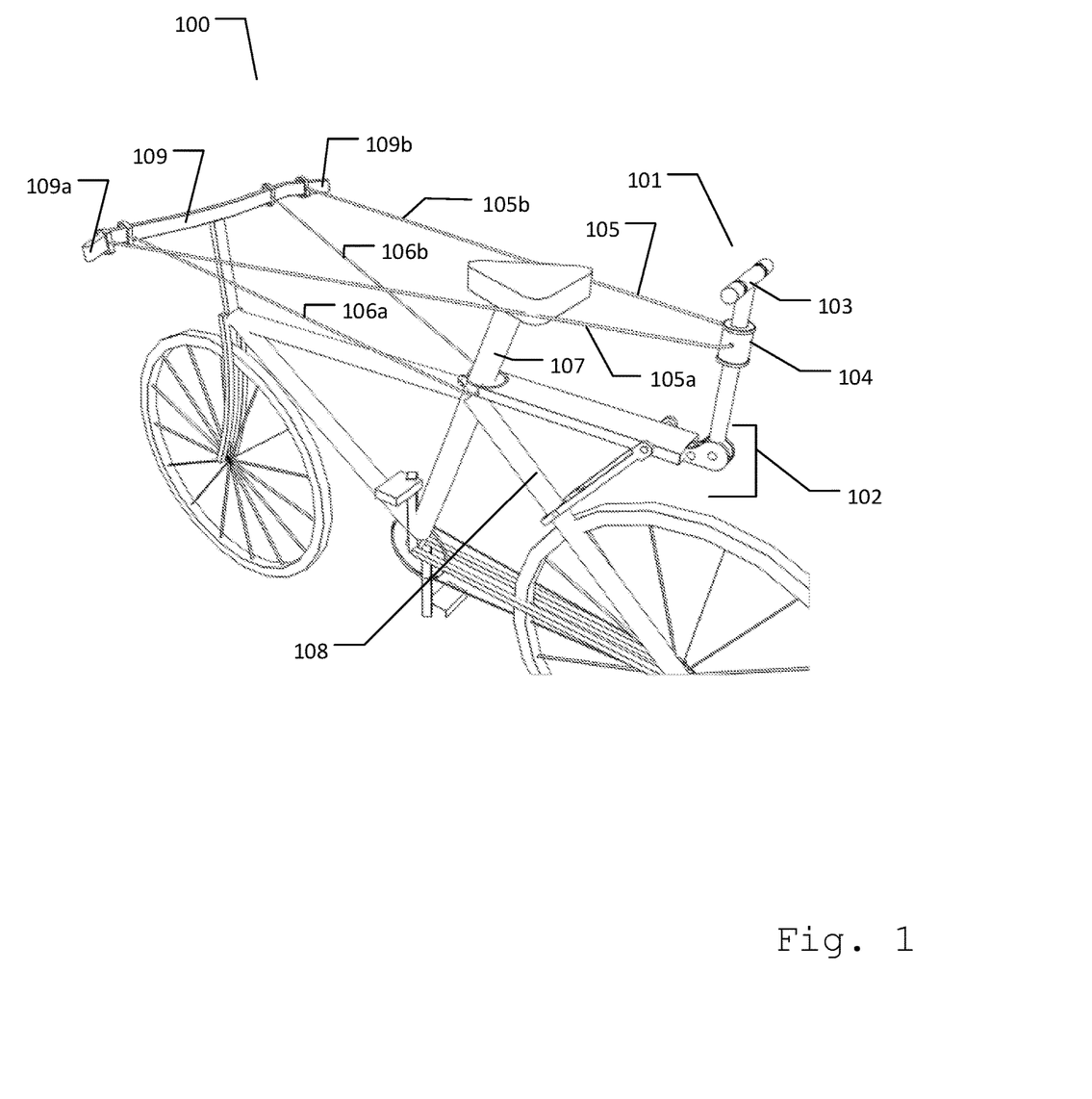
FIG. 1 illustrates a balancing system mounted to a bicycle.

FIG. 1 illustrates a balancing system 101 mounted to a bicycle 100. Balancing system 101 can attach to bicycle 100 and can allow a person to maneuver bicycle 100 while not on the bicycle. Balancing system 101 can allow a person to walk or even run with bicycle 100. In one embodiment, balancing system 101 can be attachable and detachable from bicycle 100. Balancing system 101 can comprise a frame 102, a steering system 103, and a tension system 104. Frame 102 fixes balancing system 101 to bicycle 100, giving structural support to balancing system 101. In one embodiment, frame 102 can mount to a seat post 107 and/or rear forks 108. Steering system 103 mounts to frame 102 and is mechanically maneuverable such that it can adjust tension within tension system 104.

Tension system 104 can comprise steering cables 105. Steering cables 105 can comprise a first end connectable to handlebars 109 of bicycle 100, and a second end in communication with steering system 103. For purpose of this application, "in communication with" means connected or touching in a manner that allows steering system 103 to reduce or increase tension with steering cable 105. The first end of steering cables 105 can connect to handlebars 109 in one of many ways, such as, but not limited to, using clips, ringed ends, or hooks. In one embodiment, steering cables 105 can stretch. In another embodiment, steering cables 105 can be fixed-length. In a preferred embodiment, a first steering cable 105a can connect to left handlebar 109a, and a second steering cable 105b can connect to a right handlebar 109b. A purpose of steering cables 105 is to communicate motion of steering system 103 to affect a change in position of handlebars 109. For example, steering system 103 can increase tension in first steering cable 105a and/or decrease tension in second steering cable 105b to turn handlebars 109 left. Similarly, steering system 103 can increase tension in second steering cable 105b and/or decrease tension in first steering cable 105a to turn handlebars 109 right.

In one embodiment, tension system 104 can further comprise resistance cables 106. Resistance cables 106 can comprise a first end connectable to handlebars 109, and a second end anchored to frame 102 or to bicycle 100. The first end of resistance cable 106 can also connect to handlebars 109 in one of many ways many ways, such as, but not limited to, using clips, ringed ends, or hooks. In a preferred embodiment, a first resistance cable 106a can connect to left handlebar 109a, and a second resistance cable 106b can connect to right handlebar 109b. In a preferred embodiment resistance cables 106 can stretch. A purpose of resistance cable is to increase stability in balancing system 101 by resisting or preventing overturning of handlebars 109. For example, when handlebars 109 are steered toward the left, resistance cable 106b can apply a force in opposition to such left turn. Similarly, when handlebars 109 are steered toward the right, first resistance cable 106a can apply a force in opposition to such right turn.

Figure 2:
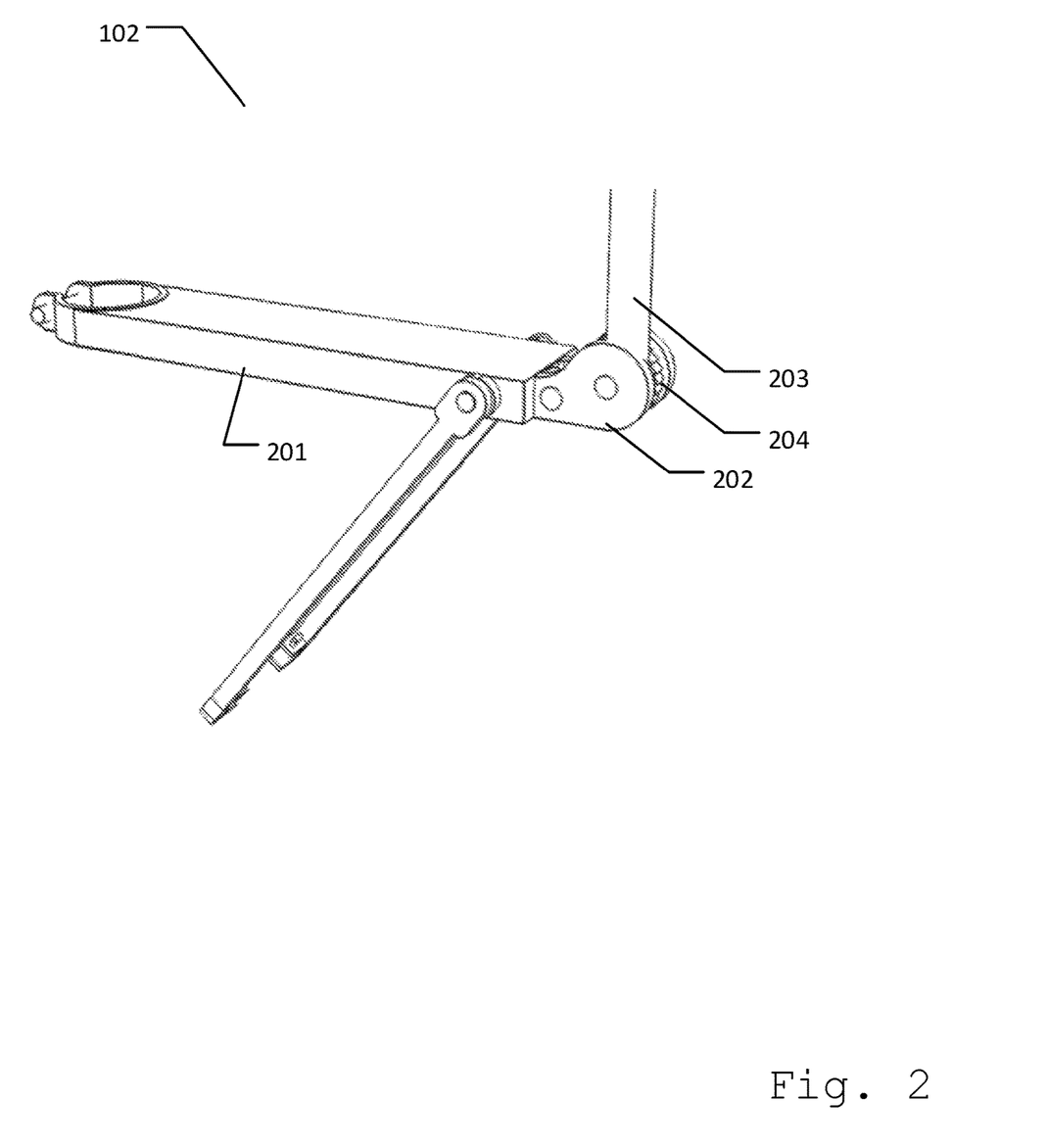
FIG. 2 illustrates an embodiment of a frame.

FIG. 2 illustrates an embodiment of frame 102. In one embodiment, frame 102 can comprise a fixed support 201, a hinge 202, and a movable support 203. In such embodiment, fixed support 201 can be affixed to bicycle 100 at one or more points. In one embodiment, fixed support 201 can affix to bicycle 100 at a single point such as at seat post 107. In another embodiment, such single point can be rear fork 108. Hinge 202 can connect movable support 203 to fixed support 201. Steering system 103 can mount to movable support 203. Using hinge 202, movable support 203 can be positioned by a person. In one embodiment, hinge 202 can have a locking mechanism such as, but not limited to, a wingnut, allowing movable support 203 to either rotate or be fixed in place. In another embodiment, hinge 202 can comprise a ratchet 204 that restricts rotating motion in a forward (toward handlebars 109) direction. Using ratchet 204, along with tension from tension system 104, movable support 203 can be fixed in a single position. Hinge 202 can allow balancing system 101 to fit various size bicycles by changing the distance between steering system 103 and handlebars 109. Hinge 202 can also allow a user to adjust the position of steering system 103 for user comfort and changing turn sensitivity.

Figure 3:
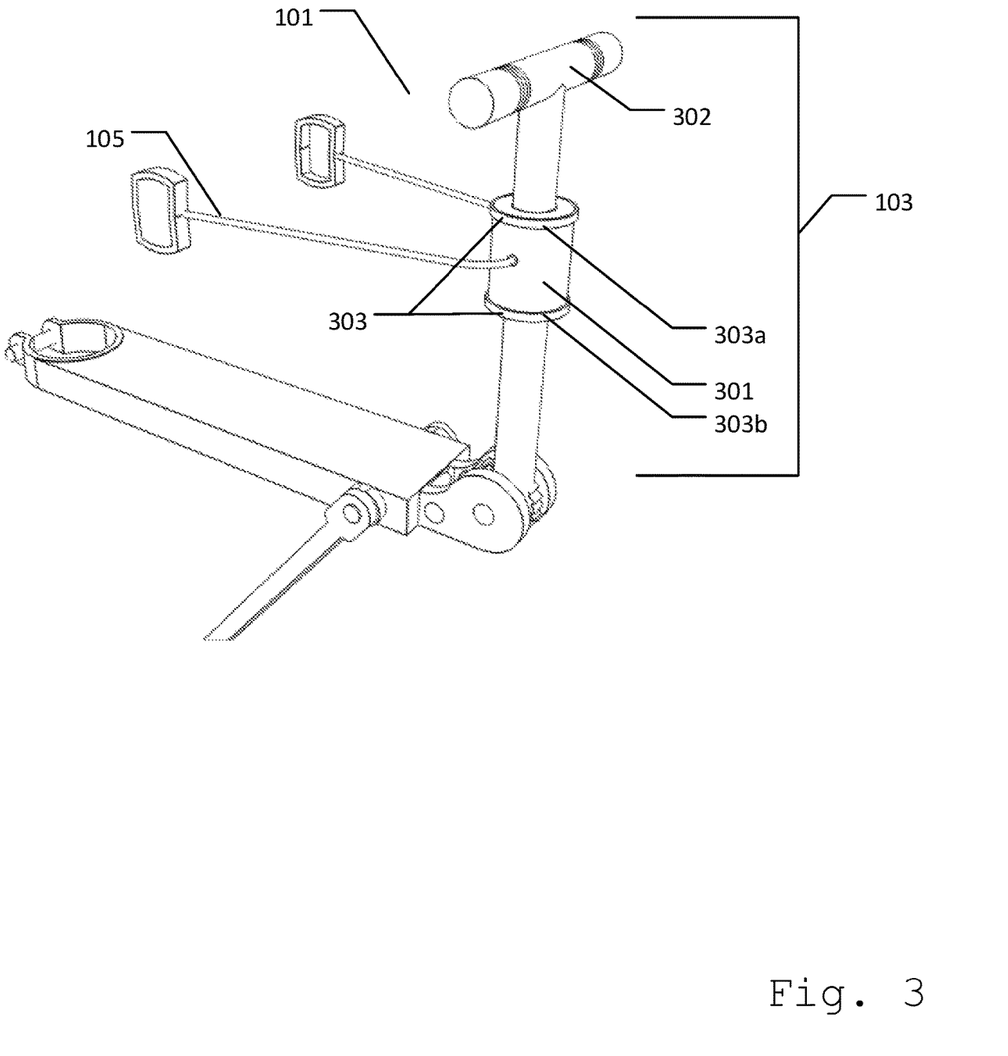
FIG. 3 illustrates one embodiment of a steering system.

FIG. 3 illustrates one embodiment of steering system 103. In one embodiment, steering system 103 can comprise a sweep 301 and a handle 302. In one embodiment, sweep 301 can be substantially cylindrical. Further, in such embodiment, steering cable 105 can be in communication with sweep 301. For example, second ends of steering cables 105 can connect to sweep 301. Sweep 301 can be mounted such that sweep 301 can rotate left and right. When sweep 301 rotates, steering cables 105 can wrap around and/or unwrap around sweep 301. In one embodiment, sweep 301 can comprise one or more lips 303. Lips can be a top lip 303a or a bottom lip 303b. Lip can help guide steering cables 105, keeping steering cables 105 on sweep 301. Handle 302 allows a user to operate steering system 103. In a preferred embodiment, handle 302 can have a T-shape form.

Figure 4:
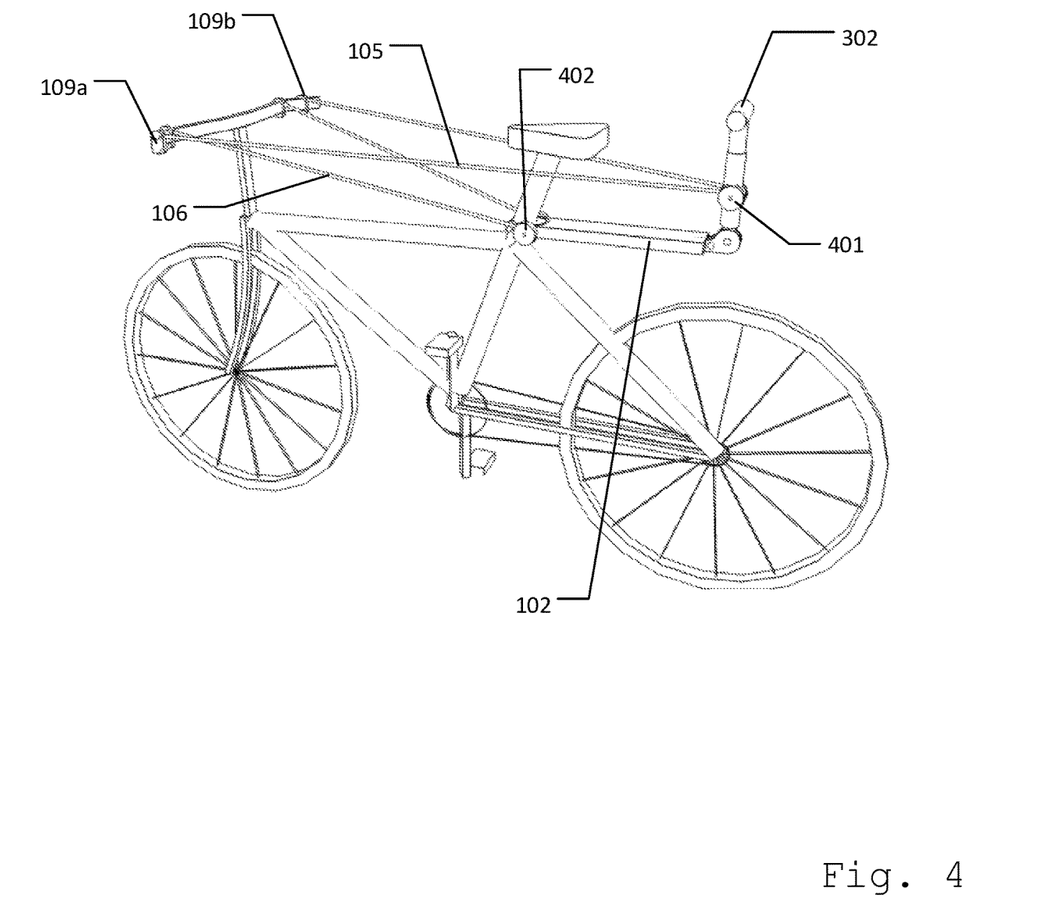
FIG. 4 illustrates an embodiment of a collapsible balancing system in an open state.

FIG. 4 illustrates an embodiment of collapsible balancing system 101 in an open state. In such embodiment, steering system 103 can comprise handle 302. In one embodiment, steering system 103 can comprise one or more steering cable reels 401. Each steering cable 105 can be retractable into a steering cable reel 401. Steering cable reel 401 can be spring-loaded such that steering cables 105 retract into steering cable reel 401 when not connected to handlebars 109. In another embodiment, frame 102 can comprise one or more resistance cable reels 402. Resistance cables 106 can be retractable into resistance cable reel 402. Resistance cable reel 402 can be spring-loaded such that resistance cables 106 retract into resistance cable reel 402 when not connected to handlebars 109.

Figure 5:
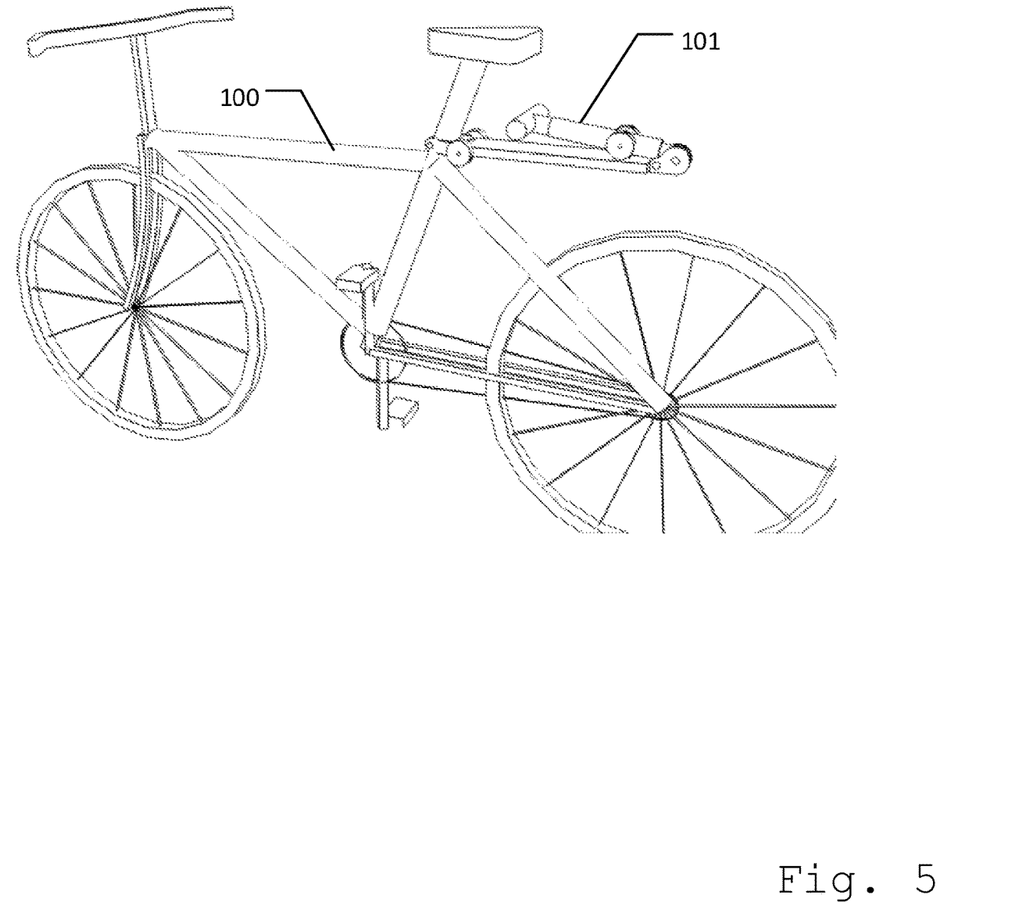
FIG. 5 illustrates an embodiment of a collapsible balancing system in a collapsed state.

FIG. 5 illustrates an embodiment of collapsible balancing system 101 in a collapsed state. Putting balancing system 101 into a collapsed state can allow a user to travel with balancing system 101 easier while riding bicycle 100.

FIGS. 6A-6E illustrates cross sections of various embodiments of sweep 301. The cross section of sweep 301 determines how and when tension will be applied to tension system 105 as steering system 103 is manipulated. For purposes of this application, words such as circular, arc, or wedge are used to described shapes close to, but in many cases deviate from a true mathematical or dictionary definition of such shapes, and are approximations. For example, an arc for our purposes can have rounded corners as opposed to sharp corners. Such rounding of corners can be useful in preventing damage to steering cables. Sensitivity of steering can be increased by increasing the overall size of sweep 301. Conversely, making steering less sensitive, sweep 301 can be made smaller.

Figure 6A:
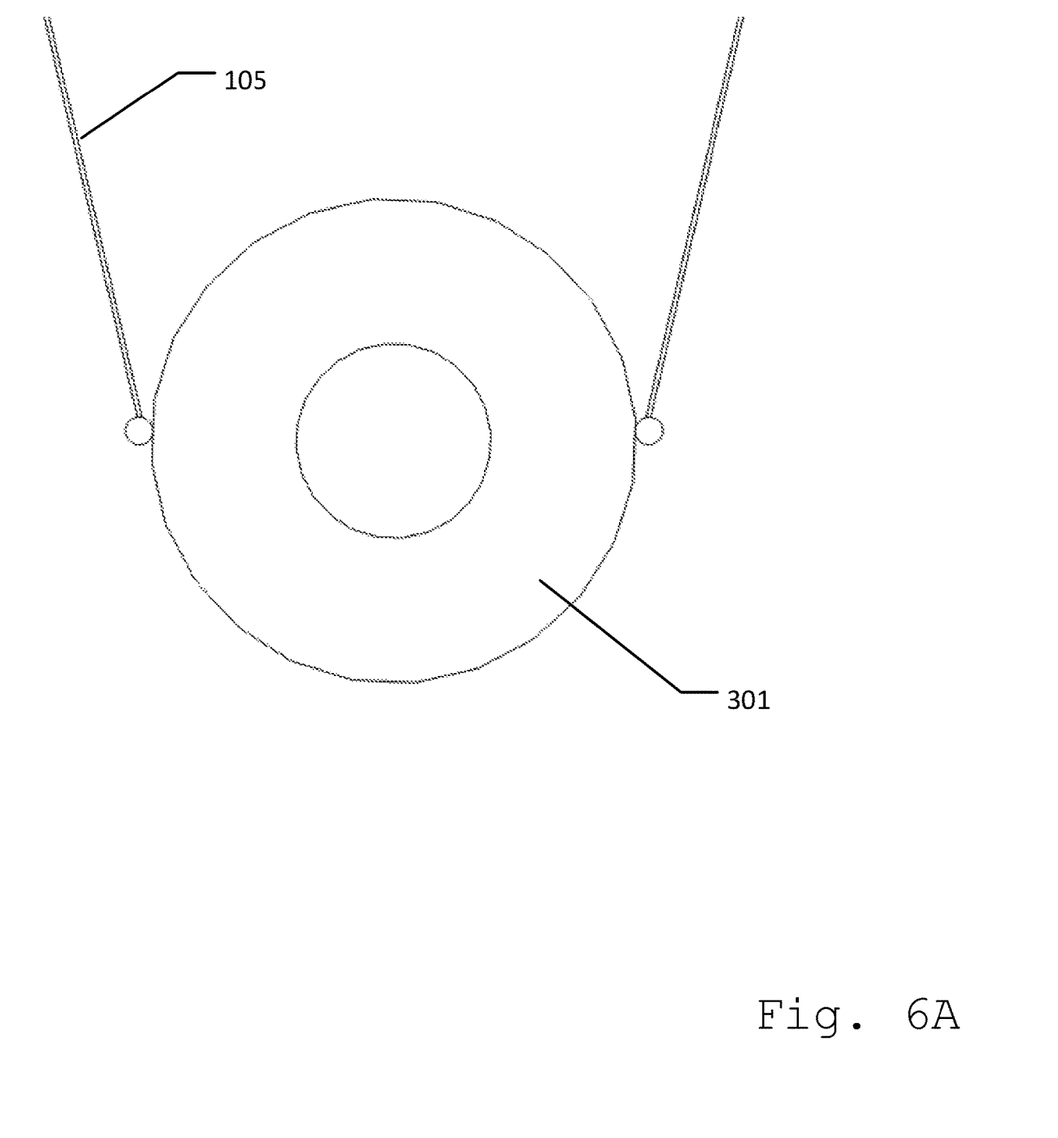
FIG. 6A illustrates an embodiment of a circular sweep wherein second ends of steering cables connect to sweep on opposite sides of the sweep.

FIG. 6A illustrates an embodiment of a circular sweep wherein second ends of steering cables connect to sweep on opposite sides of the sweep. Circular sweep has a benefit of releasing tension on one side of tension system 105 in equal amounts to applying tension on the opposite side of tension system.

Figure 6B:
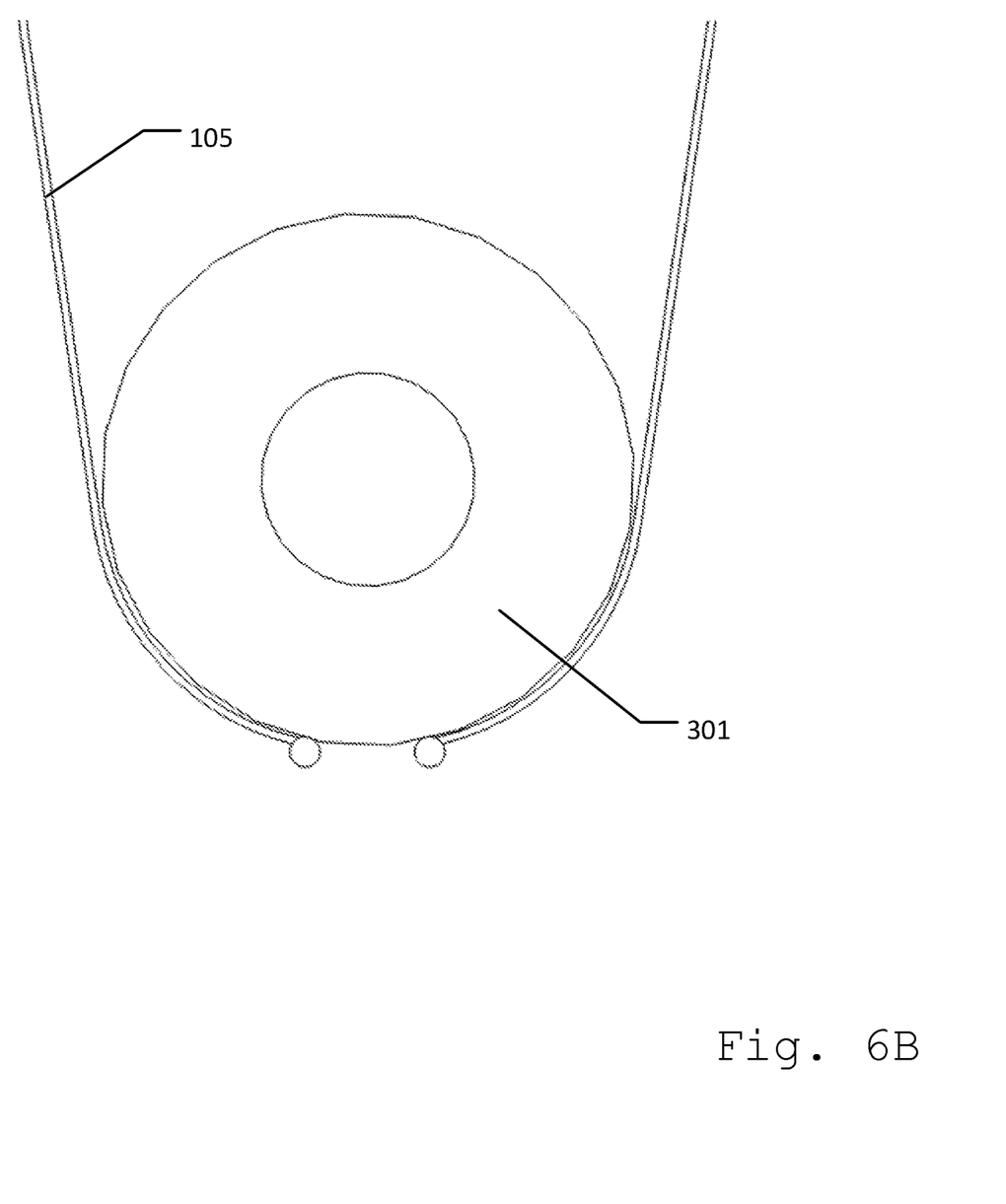
FIG. 6B illustrates an embodiment of a circular sweep wherein second ends of steering cables connect to sweep at the rear of the sweep.

FIG. 6B illustrates an embodiment of a circular sweep wherein second ends of steering cables connect to sweep at the rear of the sweep. By attaching second ends of steering cables to a rear of sweep as shown, such balanced release and application of tension described above occurs for a greater degree of turn of handlebars 109.

Figure 6C:
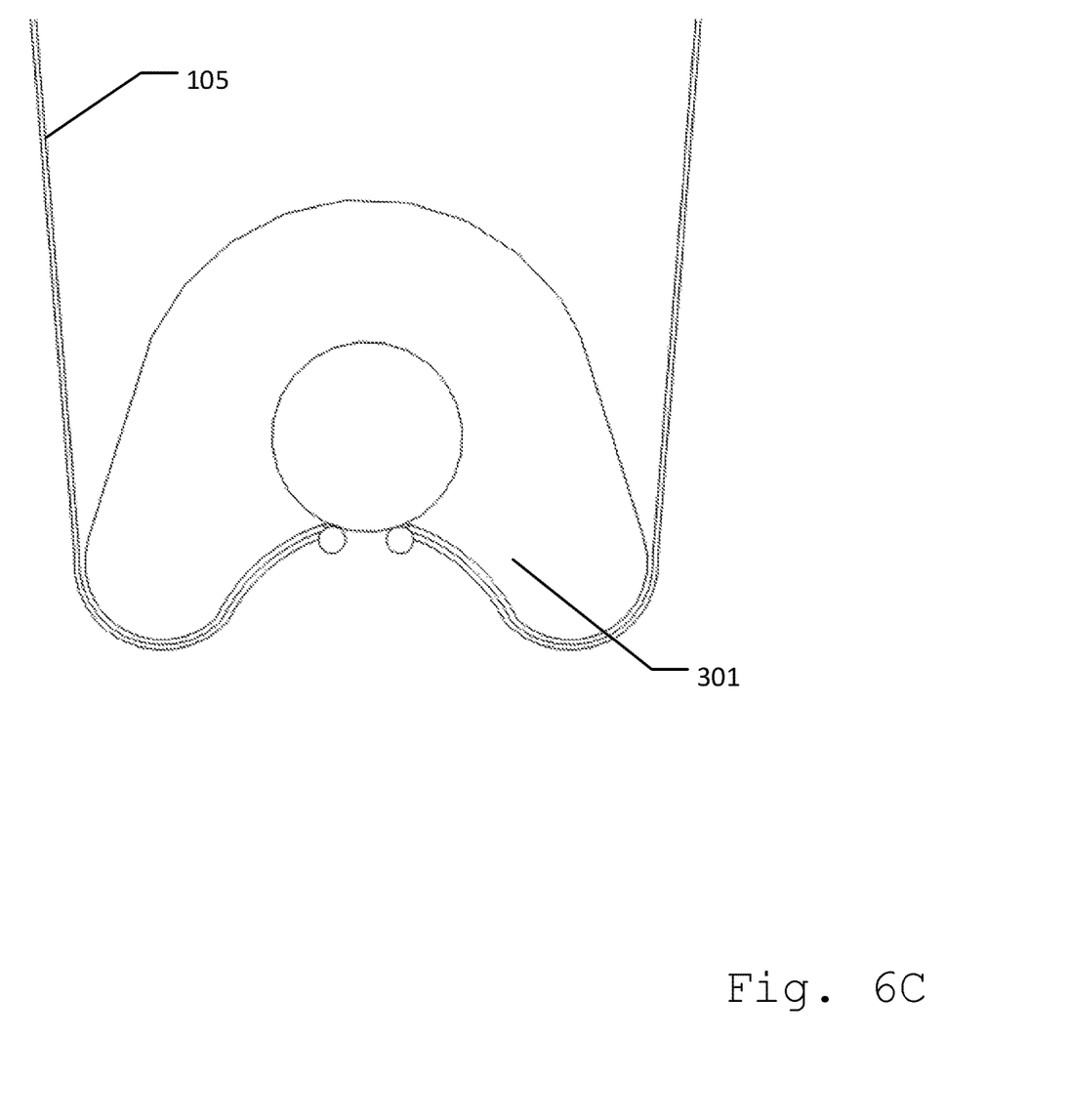
FIG. 6C illustrates an embodiment of a sweep wherein a cross section of the sweep is substantially in the shape of a forward pointing wedge.

FIG. 6C illustrates an embodiment of a sweep wherein a cross section of the sweep is substantially in the shape of a forward pointing wedge. Such shape can have an effect of giving less effect to manipulation of steering system 103 the greater a turn.

Figure 6D:
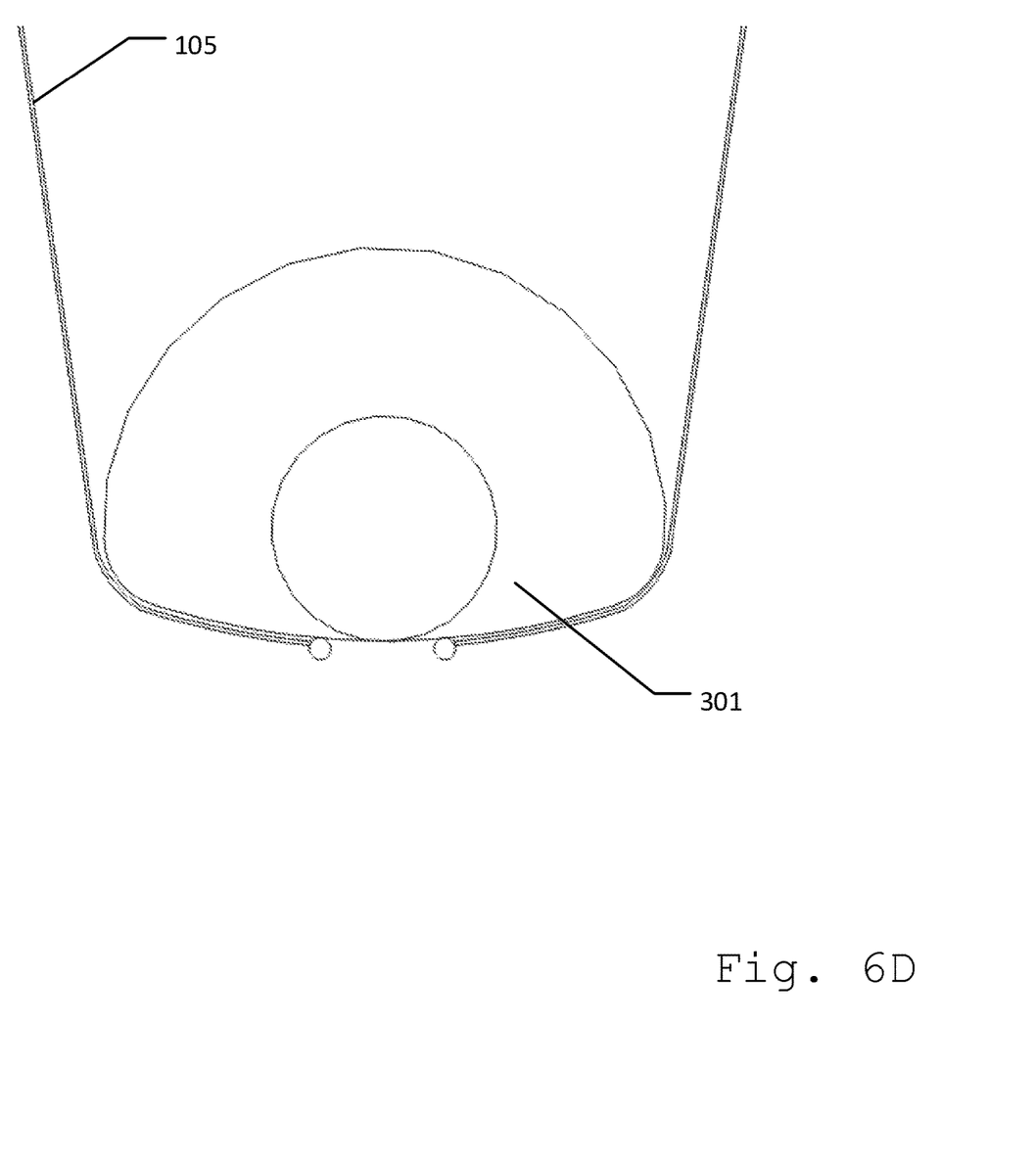
FIG. 6D illustrates an embodiment of a sweep wherein a cross section of the sweep is substantially in the shape of an arc.

FIG. 6D illustrates an embodiment of a sweep wherein a cross section of the sweep is substantially in the shape of an arc. An arc can range from a small angle such as 30 degrees to a large angle such as 300 degrees or more. Such wedge can be beneficial to ensure on large turns of steering system 103 that tension does not begin to increase when it should be decreasing or staying the substantially the same.

Figure 6E:
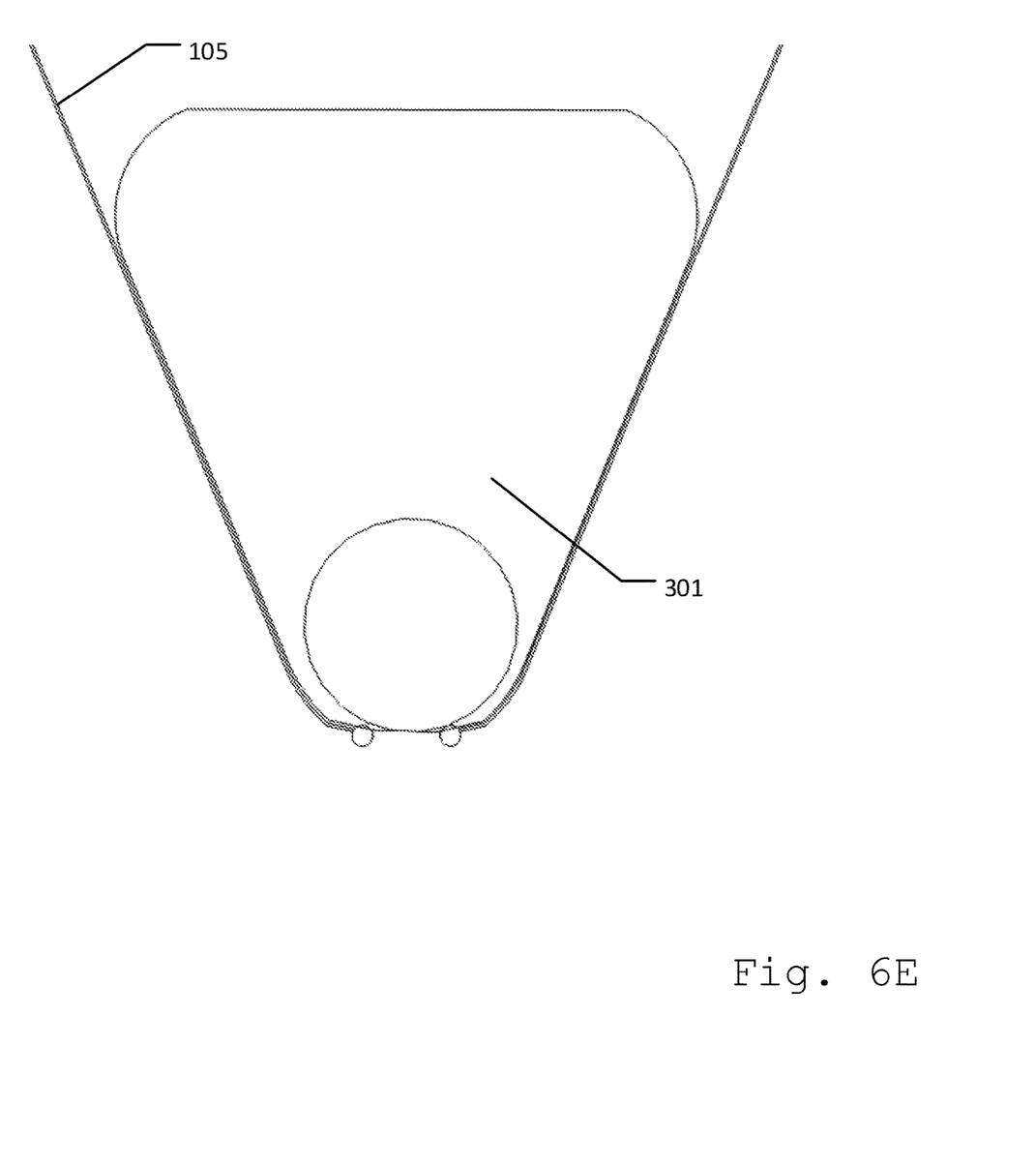
FIG. 6E illustrates an embodiment of a sweep wherein a cross section of the sweep is substantially in the shape of a rear facing wedge.

FIG. 6E illustrates an embodiment of a sweep wherein a cross section of the sweep is substantially in the shape of a rear-facing wedge. Such shape can have an effect of applying substantial tension to one side while not significantly releasing tension 105 on the opposite side of tension system 105.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:
1. A system for balancing a bicycle comprising
a frame that is capable of mounting to a bicycle;
a tension system capable of connecting with handlebars of said bicycle; and
a steering system mounted to said frame, further said steering system is in communication with said tension system such that manually maneuvering said steering system adjusts tension within said tension system to steer said bicycle,
wherein said tension system comprises one or more steering cables, a first end of said steering cables connectable to said handlebars and a second end of said steering cables connected with said steering system,
wherein each of said steering cables retracts into a steering cable reel.

2. A system for balancing a bicycle comprising
a frame that is capable of mounting to a bicycle;
a tension system capable of connecting with handlebars of said bicycle; and
a steering system mounted to said frame, further said steering system is in communication with said tension system such that manually maneuvering said steering system adjusts tension within said tension system to steer said bicycle,
wherein said tension system comprises one or more steering cables, a first end of said steering cables connectable to said handlebars and a second end of said steering cables connected with said steering system,
wherein said tension system further comprises one or more resistance cables, a first end of said resistance cables connectable to said handlebars and a second end of said resistance cables anchored to said frame.

3. The system of claim 2 wherein each of said one or more resistance cables retract into a resistance cable reel.

4. A system for balancing a bicycle comprising
a frame that is capable of mounting to a bicycle;
a tension system capable of connecting with handlebars of said bicycle; and
a steering system mounted to said frame, further said steering system is in communication with said tension system such that manually maneuvering said steering system adjusts tension within said tension system to steer said bicycle,
wherein said frame comprises
a movable support, said steering system mounted to said movable support;
a fixed support capable of being affixed to said bicycle; and
a hinge that connects said movable support to said fixed support.

5. The system of claim 4 wherein said hinge comprises a ratchet.

6. The system of claim 4 further wherein said fixed support is capable of attaching to bicycle at a seat post.

7. The system of claim 4 wherein said fixed support is capable of attaching to bicycle at a rear fork.

8. The system of claim 7 wherein said frame is collapsible by said movable support folding together with said fixed support.

9. A system for balancing a bicycle comprising
a frame that is capable of mounting to a bicycle;
a tension system capable of connecting with handlebars of said bicycle; and a steering system mounted to said frame, further said steering system is in communication with said tension system such that manually maneuvering said steering system adjusts tension within said tension system to steer said bicycle,
wherein said tension system comprises one or more steering cables, a first end of said steering cables connectable to said handlebars and a second end of said steering cables connected with said steering system,
wherein said steering system further comprises
a sweep that connects to the second ends of said steering cables, said sweep mounted to said frame such that as said sweep rotates, such rotation causes wrapping and unwrapping of said steering cables around said sweep; and
a handle that allows a user to operate said steering system.

10. The system of claim 9 wherein said sweep further comprises one or more lips capable of guiding said steering cables.

11. The system of claim 9 wherein a cross section of said sweep is substantially circular.

12. The system of claim 9 wherein a cross-section of said sweep is substantially an arc.

13. The system of claim 9 wherein said arc is around 180-degrees.

14. The system of claim 9 wherein said sweep is substantially a wedge.

15. The system of claim 9 wherein said handle is a T-handle.

16. A method for steering a bicycle comprising the steps of
maneuvering manually a steering system of a balancing system, said steering system mounted to a frame of said balancing system, said frame mounted to a bicycle;
adjusting tension within a tension system as a result of said steering system being in communication with said tension system and by the manual maneuvering of said steering system,
said tension connected to handlebars of said bicycle,
further said tension system comprising one or more steering cables, a first end of said steering cables connected to said handlebars and a second end of said steering cables connected with said steering system;
steering said bicycle as a result of adjusting tension within said tension system; and
retracting each of said one or more steering cables into a steering cable reel after steering said bicycle.

17. A method for steering a bicycle comprising the steps of
maneuvering manually a steering system of a balancing system, said steering system mounted to a frame of said balancing system, said frame mounted to a bicycle;
adjusting tension within a tension system as a result of said steering system being in communication with said tension system and by the manual maneuvering of said steering system,
said tension system connected to handlebars of said bicycle,
further said tension system comprising one or more steering cables, a first end of said steering cables connected to said handlebars and a second end of said steering cables connected with said steering system,
further said tension system comprising one or more resistance cables, a first end of said resistance cables connectable to said handlebars and a second end of said resistance cables anchored to said frame; and steering said bicycle as a result of adjusting tension within said tension system.

18. A method for steering a bicycle comprising the steps of maneuvering manually a steering system of a balancing system, said steering system mounted to a moveable support of a frame of said balancing system, a fixed support of said frame affixed to a bicycle, and a hinge of said frame connecting said movable support to said fixed support;

adjusting tension within a tension system as a result of said steering system being in communication with said tension system and by the manual maneuvering of said steering system, said tension system connected to handlebars of said bicycle, further said tension system comprising one or more steering cables, a first end of said steering cables connected to said handlebars and a second end of said steering cables connected with said steering system; and steering said bicycle as a result of adjusting tension within said tension system.

19. A method for steering a bicycle comprising the steps of maneuvering manually a steering system of a balancing system using a handle of said steering system, said steering system mounted to a frame of said balancing system, said frame mounted to a bicycle;

adjusting tension within a tension system as a result of said steering system being in communication with said tension system and by the manual maneuvering of said steering system, said tension system connected to handlebars of said bicycle, further said tension system comprising one or more steering cables, a first end of said steering cables connected to said handlebars and a second end of said steering cables connected with said steering system said steering system comprising a sweep that connects to said second end of said steering cables, said sweep mounted to said frame such that as said sweep rotates, such rotation causes wrapping and unwrapping of said steering cables around said sweep; and;

steering said bicycle as a result of adjusting tension within said tension system.

20. The method of claim 19 wherein said sweep further comprises one or more lips capable of guiding said steering cables.

* * * * *